United States Patent Office.

IVAR AXEL FERDINAND BANG AND JULES DE CASTRO, OF PARIS, FRANCE.

TREATING ACID OR PARTLY ACID FATTY BODIES.

SPECIFICATION forming part of Letters Patent No. 290,835, dated December 25, 1883.

Application filed August 16, 1883. (No specimens.)

*To all whom it may concern:*

Be it known that we, IVAR AXEL FERDINAND BANG and JULES DE CASTRO, both residents of Paris, France, have invented certain Improvements in the Treatment of Acid and partly Acid Fatty Bodies Employed in the Manufacture of Soap, of which the following is a specification.

It has been customary for a long time to decompose neutral fatty bodies to be employed in making soap in order to recover the glycerine. This decomposition is effected in autoclaves under the influence of heat and water, and sometimes with the addition of a small quantity of powder of zinc. The fatty acids obtained in this way may be employed directly in the manufacture of soap in the place of neutral fatty bodies not so treated or combined with the latter, when caustic soda free from sulphuret of sodium is employed.

Some important soap-manufactories at Marseilles, France, now employ exclusively crude sodas containing sulphuret of sodium. They could not, however, up to this time employ the fatty acids obtained by the decomposition of the fats in an autoclave, as above described, for the following reason: By reason of the high temperature developed in the autoclave during the decomposition, the fatty acids slightly attack the metals of the apparatus and form small quantities of the oleate and stearate of iron and copper, which are soluble in an excess of fatty acids. When these fatty bodies are empasted with soda containing sulphuret of sodium the latter forms, molecularly, through the paste or soap, sulphuret of iron and copper, and the soap, which should be a yellowish white, becomes gray and blackish. Some attempts have been made to obviate this defect; but, so far as we are aware, none have been successful, except our process, which forms the subject of the present application.

In carrying out our process the fatty acids from the autoclave are drawn off into a tank of wood or sheet metal lined with lead. While still hot we add an aqueous solution of sulphurous acid and mix well; or, we may add water to the fatty acids and admix sulphurous-acid gas, which will be absorbed by the water mixed with the fats. Whichever mode is adopted, the volatile character of the sulphurous acid causes it to penetrate the mass thoroughly, and it combines with the salts of iron and copper therein to form sulphites of iron and copper, which are very soluble in water. These sulphites are washed out of the mass by being dissolved in the water, and at the close of the operation will be found, together with the water, at the bottom of the tank, whence they may be drawn off by a cock. The sulphurous acid also serves in some cases the purposes of a bleaching agent, and especially when vegetable oils are treated. All other mineral acids (aside from the impossibility of employing them practically) impart a brown color to the soap.

Having thus described our invention, we claim—

The herein-described method of removing the salts of iron and copper from the fatty acids employed in soap-making, which consists in submitting said acids, while molten, to the action of water and sulphurous acid, substantially as and for the purposes set forth.

In witness whereof we have hereunto signed our names in the presence of two subscribing witnesses.

IVAR AXEL FERDINAND BANG.
JULES DE CASTRO.

Witnesses:
EDWARD P. MACLEAN,
DAVID T. S. FULLER.